US007759607B2

(12) United States Patent
Chism, II

(10) Patent No.: US 7,759,607 B2
(45) Date of Patent: Jul. 20, 2010

(54) METHOD OF DIRECT COULOMB EXPLOSION IN LASER ABLATION OF SEMICONDUCTOR STRUCTURES

(75) Inventor: William W. Chism, II, Austin, TX (US)

(73) Assignee: Optical Analytics, Inc., Austin, TX (US)

( * ) Notice: Subject to any disclaimer, the term of this patent is extended or adjusted under 35 U.S.C. 154(b) by 0 days.

(21) Appl. No.: 11/820,655

(22) Filed: Jun. 20, 2007

(65) Prior Publication Data

US 2007/0293057 A1 Dec. 20, 2007

Related U.S. Application Data

(60) Provisional application No. 60/815,109, filed on Jun. 20, 2006.

(51) Int. Cl.
B23K 26/00 (2006.01)
(52) U.S. Cl. .............................. 219/121.69; 219/121.68; 219/121.85
(58) Field of Classification Search ............ 219/121.69, 219/121.68, 121.85
See application file for complete search history.

(56) References Cited

U.S. PATENT DOCUMENTS

| | | | |
|---|---|---|---|
| 4,527,044 A * | 7/1985 | Bruel et al. ............. | 219/121.12 |
| 5,164,664 A * | 11/1992 | Soelkner ..................... | 324/752 |
| 5,656,186 A * | 8/1997 | Mourou et al. ......... | 219/121.69 |
| 5,808,272 A | 9/1998 | Sun | |
| 5,841,099 A * | 11/1998 | Owen et al. ............ | 219/121.69 |
| 5,862,845 A * | 1/1999 | Chin et al. .................. | 144/329 |
| 6,046,429 A | 4/2000 | Datta | |
| 6,214,637 B1 * | 4/2001 | Kim et al. ..................... | 438/72 |
| 6,534,743 B2 | 3/2003 | Swenson | |
| 6,590,182 B1 | 7/2003 | Domae | |
| 6,805,916 B2 * | 10/2004 | Cadieu ........................ | 427/475 |
| 6,840,669 B2 * | 1/2005 | Kleinerman ................ | 374/120 |
| 6,878,900 B2 | 4/2005 | Corkum | |
| 6,884,960 B2 * | 4/2005 | Bourne et al. .......... | 219/121.69 |
| 7,274,791 B2 * | 9/2007 | van Enk ..................... | 380/256 |
| 2001/0009250 A1 * | 7/2001 | Herman et al. ......... | 219/121.69 |
| 2003/0161022 A1 * | 8/2003 | Lazarev et al. .............. | 359/245 |
| 2004/0182416 A1 * | 9/2004 | Allen et al. .................. | 134/1.3 |
| 2004/0195221 A1 * | 10/2004 | Haglund, Jr. et al. ... | 219/121.69 |
| 2004/0222196 A1 * | 11/2004 | Callies et al. ............ | 219/121.7 |
| 2005/0061779 A1 * | 3/2005 | Blumenfeld et al. ..... | 219/121.6 |
| 2005/0098546 A1 * | 5/2005 | Roos et al. ............. | 219/121.69 |
| 2005/0226287 A1 * | 10/2005 | Shah et al. ..................... | 372/25 |
| 2008/0143021 A1 * | 6/2008 | Ehrentraut et al. .......... | 264/400 |

FOREIGN PATENT DOCUMENTS

EP  1260838 A2 * 11/2002

SU  1468701  * 3/1989

OTHER PUBLICATIONS

Yoo et al., Evidence for phase-explosion and generation of large particles during high power nanosecond laser ablation of silicon, Feb. 7, 2000, App. Phys. Lett. v. 76 #6 pp. 783-785.*
M. Mero et al., "Scaling laws of femtosecond laser pulse induced breakdown in oxide films," Phys. Rev. B, vol. 71, 115109 (2005).
R. Stoian et al.,"Comment on "Coulomb explosion in femtosecond laser ablation of Si(111)," [Appl. Phys. Lett. 82, 4190 (2003)]," Appl. Phys. Lett. 85(4), 694-695 (2004).
N.M. Bulgakova et al.,"Model description of surface charging during ultra-fast pulsed laser ablation of materials," Appl. Phys. A 79, 1153-1155 (2004).
N.M. Bulgakova et al., "Electronic transport and consequences for material removal in ultrafast pulsed laser ablation of materials," Phys. Rev. B 69, 054102 (2004).
W.G. Roeterdink et al., "Coulomb explosion in femtosecond laser ablation of Si(111)," Appl. Phys. Lett. 82, 4190 (2003).
R. Stoian et al., "Surface charging and impulsive ion ejection during ultrashort pulsed laser ablation," Phys. Rev. Lett., vol. 88, paper 097603 (2002).

(Continued)

*Primary Examiner*—M. Alexandra Elve

(57) ABSTRACT

A new technique and Method of Direct Coulomb Explosion in Laser Ablation of Semiconductor Structures in semiconductor materials is disclosed. The Method of Direct Coulomb Explosion in Laser Ablation of Semiconductor Structures provides activation of the "Coulomb explosion" mechanism in a manner which does not invoke or require the conventional avalanche photoionization mechanism, but rather utilizes direct interband absorption to generate the Coulomb explosion threshold charge densities. This approach minimizes the laser intensity necessary for material removal and provides optimal machining quality. The technique generally comprises use of a femtosecond pulsed laser to rapidly evacuate electrons from a near surface region of a semiconductor or dielectric structure, and wherein the wavelength of the laser beam is chosen such that interband optical absorption dominates the carrier production throughout the laser pulse. The further application of a strong electric field to the semiconductor or dielectric structure provides enhancement of the absorption coefficient through a field induced redshift of the optical absorption. The use of this electric field controlled optical absorption is available in all semiconductor materials and allows precise control of the ablation rate. When used in conjunction with nanoscale semiconductor or dielectric structures, the application of a strong electric field provides for laser ablation on sub-micron lateral scales.

9 Claims, No Drawings

OTHER PUBLICATIONS

C.B. Schaffer et al., "Laser-induced breakdown and damage in bulk transparent materials induced by tightly focused femtosecond laser pulses," Meas. Sci. Tech. 12, 1784 (2001).

E.G. Gamaly et al.,"Ablation of solids by femtosecond lasers: ablation mechanism and ablation thresholds for metals and dielectrics," Phys. of Plasma, vol. 9, pp. 949 (2002).

R. Stoian et al., "Coulomb explosion in ultrashort pulsed laser ablation of Al2O3," Phys. Rev. B, vol. 62, pp. 13167-13173 (2000).

A. Tien et al., "Short-pulse laser damage in transparent materials as a function of pulse duration," Phys. Rev. Lett., vol. 82, pp. 3883-3886 (1999).

M.D. Perry et al.,"Ultrashort-pulse laser machining of dielectric materials," J. Appl. Phys., vol. 85, pp. 6803-6810 (1999).

M. Li et al., "Ultrafast Electron Dynamics in Femtosecond Optical Breakdown of Dielectrics," Phys. Rev. Lett., vol. 82, pp. 2394-2397 (1999).

P.P. Pronko et al., "Avalanche ionization and dielectric breakdown in silicon with ultrafast laser pulses," Phys. Rev. B, vol. 58, pp. 2387-2390 (1998).

M. Lenzner et al., "Femtosecond Optical Breakdown in Dielectrics," Phys. Rev. Lett., vol. 80, 4076 (1998).

K. Yeom et al., "High power laser semiconductor interactions: a Monte Carlo study for silicon," J. Appl. Phys., vol. 81, pp. 1807-1812 (1997).

H.P. Cheng and J.D. Gillespy, "Nanoscale modification of silicon surfaces via Coulomb explosion," Phys. Rev. B, pp. 2628-2636 (1997).

G. Herbst et al., "Ablation of Si and Ge using UV femtosecond laser pulses", Mater. Res Soc. Symp. Proc., vol. 397, pp. 69-74 (1996).

B.N. Chichkov et al., "Femtosecond, picosecond and nanosecond laser ablation of solids," Appl. Phys. A, vol. 63, pp. 109-115 (1996).

B.C. Stuart et al., "Nanosecond-to-femtosecond laser-induced breakdown in dielectrics," Phys. Rev. B, vol. 53, pp. 1749 (1996).

B.C. Stuart et al., "Optical ablation by high-power short-pulse lasers," J. Opt. Soc. Amer. B, vol. 13, pp. 459 (1996).

D. Du, X. Liu, and G. Mourou, "Reduction in multi-photon ionization in dielectrics due to collisions," Appl. Phys. B, vol. 63, pp. 617-621 (1996).

B.C. Stuart et al., "Laser-Induced Damage in Dielectrics with Nanosecond to Subpicosecond Pulses," Phys. Rev. Letters, vol. 74, pp. 2248 (1995).

P.P. Pronko et al., "Thermophysical effects in laser processing of materials with picosecond and femtosecond pulses," J. Appl. Phys., vol. 78, pp. 6233-6240 (1995).

M.H. Niemz, "Threshold dependence of laser induced optical breakdown on pulse duration," Appl. Phys. Lett., vol. 66, pp. 1181-1183 (1995).

D. Du et al., "Laser-induced breakdown by impact ionization in SiO2 with pulse widths form 7 ns to 150 fs," Appl. Phys. Letters, vol. 64, pp. 3071 (1994).

N. Bloembergen, "Laser induced electric breakdown in solids," IEEE J. Quantum Electron, vol. QE-10, pp. 375-386 (1974).

\* cited by examiner

METHOD OF DIRECT COULOMB EXPLOSION IN LASER ABLATION OF SEMICONDUCTOR STRUCTURES

CROSS-REFERENCE TO RELATED APPLICATIONS

The present invention claims benefit of U.S. Provisional Patent Application Ser. No. 60/815,109, filed on Jun. 20, 2006, which is incorporated herein in its entirety by reference.

FIELD OF THE INVENTION

The present disclosure relates generally to laser ablation and more particularly to activation of the Coulomb explosion mechanism in the laser ablation of semiconductor materials by means of direct interband transitions.

BACKGROUND OF THE INVENTION

Laser ablation has proven a useful tool for micrometer scale machining of metal and dielectric materials. The laser ablation process is not completely understood, however, it generally can be divided into two types: a thermally activated ablation associated with nanosecond timescale laser pulses; and a non-thermal ablation associated with picosecond and femtosecond pulse lengths. The thermal vaporization is also known as "strong ablation," since it results in greater rates of material removal and is the dominant mechanism at laser fluences well above the ablation threshold. The non-thermal ablation is also known as "gentle ablation," since it occurs near the ablation threshold and tends to result in optimal surface quality with material removal controllable on the nanometer scale. For example, the gentle ablation does not produce a melt zone. As such, the gentle ablation mechanism is more desirable for precise control of the machining process than is thermal ablation. Gentle ablation is thought to occur through a physical mechanism analogous to the "Coulomb explosion" seen in gas clusters, wherein a laser pulse is used to rapidly evacuate electrons from a region of the gas such that the Coulombic repulsion of the positive ions then leads to rapid expansion. In solids, it is hypothesized Coulomb explosion is driven by positively charged near-surface layers which electrostaticly repel each other, possibly aided by the pull of ionizing electrons [Gamaly, 2002].

The key to activating this non-thermal, or "cold" ablation then lies in the electron dynamics. Work in the prior art has entailed modeling the electron dynamics with the Fokker-Planck equation. The production of electrons is due to two types of optical absorption: the sum over all interband optical absorptions including multi-photon absorptions; and the "avalanche" photoionization. Avalanche photoionization is due to free carrier absorption and therefore of primary importance in metals. It also can become dominant in dielectrics once the carrier density reaches a critical value. To see this point, it is useful to consider the differential equation conventionally taken to describe the carrier dynamics a laser field:

$$dN_e/dt = \Sigma \alpha_m I^m + \beta N_e I - N_e/\tau,$$

where $N_e$ is the carrier density, I is the laser intensity inside the sample, $\alpha_m$ are the multi-photon absorption coefficients, $\beta$ is the "avalanche" absorption coefficient, and $\tau$ is the phenomenological carrier relaxation time [Mero, 2005]. For purposes of understanding the carrier production during ultrashort laser pulses, the relaxation term may be neglected. The equation may then be viewed as an interpolation scheme—during the leading edge of the laser pulse, the carrier density is small and therefore the avalanche absorption will be negligible, resulting in a carrier density $N_e \approx \int \Sigma \alpha_m I^m \, dt$, whereas later in the pulse, once the carrier density becomes significant, the avalanche term becomes dominant and the solution takes the exponential form $N_e \approx N_o \exp\{\beta It\}$ [Gamaly, 2002]. For dielectric materials irradiated by a typical femtosecond laser wavelength of ~800 nm, the linear optical absorption will be small. Therefore, the avalanche seeding process proceeds through multi-photon absorption, and hence requires strong laser intensity. Once the seed density is reached the avalanche absorption leads to very rapid ablation. Thus, the seed carrier density typically invoked as the ablation threshold density is the critical density at which the plasma becomes opaque. This condition occurs when $\omega_p \geq \omega$, where $\omega_p$ is the Drude plasma frequency and $\omega$ is the laser photon frequency. The plasma frequency and photon frequency are given by the relations $\omega_p^2 = N_e e^2/\epsilon_o m^*$, and $\omega = 2\pi c/\lambda$, respectively, where e is the electronic charge, $\epsilon_o$ is the vacuum permittivity (8.85×$10^{-12}$ C$^2$/N·m$^2$), m* is the electron effective mass, c is the speed of light, and $\lambda$ is the laser wavelength. The critical Drude plasma density is then: $N_{cr} = 4m^*\epsilon_o \pi^2 c^2/e^2 \lambda^2$, and typically takes values of $N_{cr} \approx 10^{21}$/cm$^3$. Note this not the actual ablation density, but rather, the density which seeds the exponential avalanche process.

To estimate the charge density needed to induce ablation through the Coulomb explosion, it has been suggested ablation occurs whenever the electrostatic force due to the surface charge density exceeds the bonding force [Bulgakova, 2004]. The bonding stress may be estimated as a percentage of the Young's modulus, typically taken at ~5-10%. This implies electric fields of ~1-5×$10^{10}$ V/m are required to exceed the bonding force. The surface charge densities corresponding to such fields can be estimated from the Poisson relation: $F=(2eN_eV/\epsilon)^{1/2}$, where V is the built-in surface voltage (~1V) and $\epsilon$ is the permittivity of the material ($\approx 10\epsilon_o$). From this expression, it may be seen the surface charge densities required to produce such fields are greater than 1×$10^{22}$/cm$^3$. The threshold fractional ionization per atom required for Coulomb explosion of silicon has been estimated in the range 0.3-0.65, corresponding to charge densities of 1.5-3.5×$10^{22}$/cm$^3$ [Stoian, 2004].

The Coulomb explosion mechanism has been clearly observed in laser ablation of dielectrics [Stoian, 2000]. It has also been postulated that low conductivity silicon behaves similarly to dielectrics, thus allowing Coulomb explosion [Roeterdink, 2003]. However, calculations have been performed suggesting the threshold charge density is not reached due to charge reneutralization [Bulgakova, 2004]. A fundamental advantage of the disclosure contained herein is the use of strong linear semiconductor absorption such that the conditions for Coulomb explosion are met without requirement for avalanche photoionization. This enables the use of a lower laser intensity to ablate material, hence providing enhanced control over material removal rates attained in the Coulomb explosion (CE) process. A further advantage may be obtained over the conventional CE machining process by the function of the static electric field to enhance the linear optical absorption. This dependence of the optical absorption on electric field has never been disclosed or utilized in the prior art of laser ablation. In particular, nearby to strong interband transitions, the optical absorption takes the form $\alpha(F) = \alpha_o + \alpha_2 F^2$, where $\alpha_o$ is the linear optical absorption at zero field, and $\alpha_2$ is a third order non-linear optical absorption coefficient. $\alpha_2$ itself depends on the electric field and in particular describes the redshifting of semiconductor interband transitions in a strong electric field [Keldysh, 1958]. The field dependence of $\alpha_2$ may be used to moderate the laser absorption by an order of magnitude or more. Therefore, given selection of laser wavelength to coincide with strong optical absorptions such that avalanche photoionization is suppressed or takes secondary importance, the addition of a strong electric field may be utilized to further reduce the intensity required to generate the threshold carrier density.

Additionally, conventional laser ablation cannot be conveniently used for nanometer scale machining since it is limited by far field spot size focus limit, typically on the order of a micron. By the use of nanometer scale surface variations to provide nanometer scale variation of the electric field, ablation can be achieved on lateral scales smaller than the laser spot diameter.

Thus, while the prior art may be suitable for the particular purposes which they address, they are not as suitable for laser ablation of semiconductor materials. In these respects, the laser ablation technique according to the present disclosure substantially departs from the conventional concepts and designs of the prior art, and in so doing provides a technique primarily developed for the purpose of nanoscale laser machining of semiconductor materials.

SUMMARY OF THE INVENTION

In view of the foregoing disadvantages inherent in the known laser ablation methods in the prior art, the present disclosure provides a new Method of Direct Coulomb Explosion in Laser Ablation of Semiconductor Structures.

The Method of Direct Coulomb Explosion in Laser Ablation of Semiconductor Structures disclosed herein is capable of rapidly evacuating electrons from the focal region in a semiconductor material through the use of a femtosecond pulsed laser. This rapid evacuation results in the creation of positively charged near-surface layers which electrostaticly repel each other. Once the local binding force is exceeded, lattice ions undergo Coulomb explosion, resulting in the ablation of material. Selection of the laser wavelength to coincide with strong linear optical absorption provides efficient electron generation, effecting a substantial reduction in the ablation threshold intensity. The application of a strong static electric field allows the laser pulse to control the carrier density at or very near the ablation threshold. This allows maximal control over the ablation rate. The use of this field enhanced optical absorption is available in all semiconductor materials and provides a large enhancement of the absorption coefficient through an electric field induced redshift of the optical absorption. In these respects, the present disclosure provides a new Method of Direct Coulomb Explosion in Laser Ablation of Semiconductor Structures that has many of the advantages of the conventional laser ablation art mentioned heretofore and many novel features that result in a new Method of Direct Coulomb Explosion in Laser Ablation of Semiconductor Structures which is not anticipated, rendered obvious, suggested, or even implied by any of the prior art of laser ablation, either alone or in any combination thereof.

To attain this, the Method of Direct Coulomb Explosion in Laser Ablation of Semiconductor Structures generally comprises a semiconductor material with an exposed surface, a femtosecond pulsed laser system, and an optical system for delivery of the laser beam onto the sample surface effective to induce Coulomb explosion of near-surface layers. The Method of Direct Coulomb Explosion in Laser Ablation of Semiconductor Structures also comprises methods and instrumentation for analysis of ablated ions such as those commonly found in Laser-Induced Breakdown Spectroscopy (LIBS), and/or Field Ion Microscopy (FIM). The Method of Direct Coulomb Explosion in Laser Ablation of Semiconductor Structures further comprises methods and instrumentation to apply a strong electric field to the surface of the semiconductor structure. The semiconductor structure may comprise planar semiconductor surfaces subject to strong electrical fields, or comprise surfaces subject to very strong electrical fields such as those found in conventional field ionization microscopes and atom probes, or may consist of nanoscale patterned structures producing nanometer scale electric field variations. The electric field is held effectively static during the laser pulse. With selection of the laser wavelength at or near strong optical absorption features of the semiconductor under process, the external field is used to enhance and control the optical absorption of said semiconductor material. The pulsed laser is a commercially available femtosecond laser system operating in the VIS-UV, with mount. The laser beam is collimated and directed onto the sample surface using a focusing lens arrangement. The optical system consists of a number of optical elements positioned to provide for the propagation of light from the laser source, and onto the sample surface.

The semiconductor materials that are the subject of the present disclosure may be any semiconductor materials, and may include, but are not limited to Group II-VI semiconductor materials or Group III-V semiconductor materials. In certain embodiments such materials may include silicon, carbon, germanium, silicon carbide, silicon germanium, boron, nitrogen, phosphorus, arsenic, or any combinations thereof, or they may include gallium arsenide, aluminum arsenide, gallium nitride, aluminum nitride, indium nitride, gallium phosphide, indium phosphide, indium arsenide, or any combinations thereof.

In this respect, before explaining at least one embodiment of the Method of Direct Coulomb Explosion in Laser Ablation of Semiconductor Structures in detail, it is to be understood that the Method of Direct Coulomb Explosion in Laser Ablation of Semiconductor Structures is not limited in its application to the details of construction and to the arrangements of the components set forth in the following description. The disclosure is capable of other embodiments and of being practiced and carried out in various ways. Also, it is to be understood that the phraseology and terminology employed herein are for the purpose of the description and should not be regarded as limiting. Advantages of the electric field ablation technique will become obvious to the reader and it is intended that these objects and advantages are within the scope of the disclosure. There has thus been outlined the more important features of the Method of Direct Coulomb Explosion in Laser Ablation of Semiconductor Structures so that the detailed description thereof may be better understood, and in order that the present contribution to the art may be better appreciated. There are additional features of the disclosure that will be described hereinafter.

DETAILED DESCRIPTION

The following discusses use of the new technique and Method of Direct Coulomb Explosion in Laser Ablation of Semiconductor Structures for laser ablation of silicon semiconductor structures. It is understood that the Method of Direct Coulomb Explosion in Laser Ablation of Semiconductor Structures of the present description may be used to perform material removal on any semiconductor structure, the discussion of silicon semiconductor structures considered to be exemplary only and in no way limiting in scope.

As discussed in the background, the activation of the Coulomb explosion mechanism in laser ablation is predicated on the efficient and rapid evacuation of electrons. In the prior art activation of Coulomb explosion in typical dielectrics, a seed carrier density is first created though multi-photon absorption in an intense laser field, followed by the onset of avalanche photoionization. The avalanche photoionization term is due to free carrier absorption and is therefore also operative in metals, although no seed stage is necessary. In the disclosure contained herein, the wavelength of the laser is selected to maximize the linear optical absorption such that the avalanche process becomes secondary or unnecessary. In order to understand this, consider the exemplary case of an approximately 400 nm wavelength femtosecond laser applied to the ablation of silicon. At this wavelength, well above the band edge of silicon, the linear absorption coefficient is substantial and any multi-photon absorption may be neglected. Neglecting the carrier relaxation term, the equation which describes carrier production in a laser field becomes:

$$dN_e/dt = [\alpha(F) + \alpha_D(N_e)] \times I,$$

where $\alpha(F)$ is the linear optical absorption coefficient, which depends on the electric field F, and $\alpha_D(N_e)$ is the Drude carrier absorption, which depends on the carrier density. Note from this expression the formal connection between the Drude absorption and the avalanche absorption coefficient may be identified. The semiconductor optical absorption will dominate the carrier generation process provided $\alpha(F) \geq \alpha_D(N_e)$. At 400 nm wavelength, the Drude absorption is well approximated by $\alpha_D(N_e) \cong 1/nc\tau \times N_e e^2/\epsilon_o m^* \omega^2$, where n is the index of refraction at the laser wavelength and $\tau$ is the plasma relaxation time. The condition $\alpha(F) \geq \alpha_D(N_e)$ implies $N_e \leq nc\tau m^* \omega^2 \epsilon_o \alpha(F)/e^2$. Taking $n \approx 5.6$, $\tau \approx 200$ fs, $m^* \approx 0.3\ m_e$, $\lambda \approx 400$ nm, and $\alpha(F) \approx 1 \times 10^6$/cm (constant), the condition $\alpha(F) \geq \alpha_D(N_e)$ is satisfied for carrier densities $N_e \leq 7 \times 10^{25}$/cm$^3$. This carrier density exceeds, by several orders of magnitude, the threshold density at which material is expected to undergo ablation due to Coulomb explosion. Hence, femtosecond Coulomb explosion of Si with 400 nm wavelength does not invoke or require the avalanche photoionization mechanism. Equivalently stated, the short absorption depth of Si at 400 nm wavelength would require a plasma density $\sim 10^{25}$/cm$^3$ in order to attain comparable plasma skin depths. In practice, this never occurs.

Without the avalanche photoionization term, the solution to the differential equation at the end of the laser pulse becomes: $N_e \approx \alpha(F) \times I \times \tau_p$, where $\tau_p$ is the laser pulse width. Assuming values of $\alpha(F) \approx 1 \times 10^6$/cm, $\tau_p \approx 150$ fs, and $N_{th} \approx 1 \times 10^{23}$/cm$^3$, where $N_{th}$ is the approximate Coulomb explosion threshold, a threshold intensity of $I_{th} \approx 3.3 \times 10^{11}$ W/cm$^2$ may be estimated. This is well below the $\sim 10^{13}$-$10^{14}$ W/cm$^2$ thresholds commonly seen for avalanche photoionization. For pulse lengths up to the plasma relaxation time $\tau$, a longer laser pulse requires proportionally less intensity, since it is the laser fluence which governs the final carrier density. The presence of a relaxation term will suppress the induced carrier density by a factor of $\sim \exp\{-\tau_p/\tau\}$. For Si and the carrier densities under discussion herein, relaxation times are commonly estimated to be in the range of $\sim 20$-200 fs, corresponding to Si mobilities $\mu \approx 10^2$-$10^3$ cm$^2$/V·s.

An instructive counterpoint to this example is obtained when the activation of Coulomb explosion in silicon through the conventional avalanche photoionization is considered. In an exemplary case, consider an approximately 800 nm wavelength laser applied to the conventional avalanche photoionization activation of Coulomb explosion in silicon. This wavelength is above the band edge of silicon, so multi-photon absorptions may again be neglected. The linear absorption must develop a seed plasma density of $N_e \approx 10^{21}$/cm$^3$ within approximately the first half of the pulse. Using $N_e \approx \alpha \times I \times \tau_p \div 2$, with $\alpha \approx 1 \times 10^3$/cm and $\tau_p \approx 200$ fs, the estimated intensity to seed the avalanche $I \approx 2.5 \times 10^{12}$ W/cm$^2$, or greater. An analogous estimate of the intensity required to seed the avalanche, for the case of 400 nm radiation of silicon, results in $I \approx 5 \times 10^9$ W/cm$^2$. However, as discussed, this estimate is purely hypothetical since the linear optical absorption will continue to dominate the avalanche photoionization even well beyond the Coulomb explosion threshold density.

Another key advantage inherent to the Method of Direct Coulomb Explosion in Laser Ablation of Semiconductor Structures is the ability to use an externally applied electric field to enhance the linear optical absorption. Nearby to strong features in the optical absorption spectra of a semiconductor material, the field dependence of the optical absorption coefficient will be large. In particular, the optical absorption of semiconductors and dielectrics undergoes significant redshifting in strong electric fields. This effect is known as the Franz-Keldysh effect [Keldysh, 1958], and may be explained as follows. Since the strong electric field tilts the semiconductor bandstructure spatially, electrons may tunnel from the valence band to the conduction band. Thus, at photon energies just below strong absorption features, the redshift of the absorption is due to photon-stimulated tunneling [Yu & Cardona, 2001]. The dependence of the absorption coefficient on electric field F is given by:

$$\alpha(F) = KF^2 \exp\{-C/F\},$$

where K and C are constants which depend on the "zero field" absorption, the effective electronic mass, and the difference in laser wavelength from the strong absorption feature. The "zero field" absorption is the optical absorption of the material wherein no electric field is applied. The expression above describes the redshifting of an optical absorption edge in the presence of a strong electric field [Keldysh, 1958]. The 400 nanometer wavelength laser is nearby to such an absorption edge in silicon, which occurs at a wavelength of approximately 375 nanometers. As an externally applied field approaches $10^7$ V/cm, the silicon optical absorption coefficient increases about an order of magnitude from $10^5$/cm to $10^6$/cm. Thus, an externally applied electric field may be used to enhance and control the optical absorption coefficient.

It is therefore instructive to understand the ablation threshold for Coulomb explosion in the case of electric fields F $\sim 10^6$-$10^7$ V/m. For the laser pulse lengths under consideration herein, the electrons will thermally equilibrate but will not have time to transfer their energy to the lattice via collisions or thermal diffusion. The kinetic energy the electron attains from the field is given by $\Delta K = m^* v_S^2/2$, where $v_S$ is the saturation velocity ($\Delta K$ is on the order $\sim 10$ meV, so it does not add substantial energy to the electron) [Yu & Cardona, 2001,]. The equation for the average change in electron temperature $T_e$ (or energy) due to laser absorption is given by:

$$c_e(T_e)N_e \times \partial T_e/\partial t = -\partial S/\partial x;\ S = (1-R)I_o \times \exp\{-2x/\delta\},$$

where $c_e$ is the specific heat of conduction electrons, and S is the absorbed energy flux as a function of depth (R is the reflectivity and $I_o$ is the incident intensity) [Chichkov, 1996]. Near the laser ablation threshold $T_e \approx E_F$, and $c_e \approx 3/2$. The average change in electron energy then may be expressed: $T_e \approx 4/3 \times (1-R)I\tau_p/\delta N_{at} \times \exp\{-2x/\delta\}$. The threshold fluence for ablation is conventionally determined by the requirement the electron energy $T_e$ reach, within a surface layer $x \ll \delta$, a value equal to the sum of the atomic binding energy and the electron ionization energy, i.e. $T_e \geq E_b + I_p$. This is the threshold condition for energetic electrons to escape the solid and produce a strong charge separation field which then results in the Coulomb explosion of the surface layers [Gamaly, 2002]. Solving the relation $T_e \geq E_b + I_p$ for the fluence $I_{th}\tau_p$, yields the threshold dependence on the static field:

$$(1-R)I_{th}\tau_p \approx 3/8 \times N_{at}/\alpha(F) \times (E_b + I_p).$$

For Si at 400 nm, the reflectivity is roughly 50%. The Si binding energy is $E_b \approx 4.62$ eV/atom, and the ionization potential is $I_p \approx 1.12$ eV. The predicted threshold fluence is then $I_{th}\tau_p \approx 20$ mJ/cm$^2$. For a pulse length of approximately 200 fs, this corresponds to a pulse intensity of approximately $10^{11}$ W/cm$^2$. This estimate agrees with the earlier estimate from use of the linear semiconductor absorption to generate threshold carrier densities. It is instructive to compare this to the expression for threshold derived for avalanche activated ablation. For a plasma skin layer, we have $1-R \approx 2\,\omega\delta/c$, which is justified at critical density. The threshold fluence then becomes $I_{th}\tau_p \approx 3/8 \times \lambda N_{at}/2\pi \times (E_b + I_p)$. From this, it is seen the ablation threshold in the Method of Direct Coulomb Explosion in Laser Ablation of Semiconductor Structures is reduced by a factor $\approx 2\pi/\lambda \cdot \alpha(F)$ relative to the conventionally used avalanche ablation mechanism. For the exemplary case of ablation of silicon using 400 nm radiation herein, this results in a more than six (6) times reduction in the threshold intensity. Using the relation $\alpha = 4\pi k/\lambda$, where k is the imaginary part of the complex index of refraction, known as the extinction coefficient, it may be seen the ablation process will proceed through semiconductor linear optical absorption, and not the avalanche (Drude) absorption, provided $k \geq \frac{1}{2}$. Also note in the Method of Direct Coulomb Explosion in Laser Ablation of Semiconductor Structures, k depends on the applied electric field and therefore field induced shifts of the optical absorption may be used to effect reductions in ablation threshold.

In order to estimate the ablation rates attained in the Method of Direct Coulomb Explosion in Laser Ablation of Semiconductor Structures, we note that due to the exponential decrease of the electron energy into the surface, the ablation depth is of the order of the absorption depth and exhibits a logarithmic dependence on fluence. The ablation depth may therefore be written $L_{ab} \sim \delta/2 \times \ln\{I/I_{th}\}$. The number of particles ablated per unit area per unit time can be estimated as $j \sim L_{ab} N_{at}/\tau_p \sim \delta/2 \times N_{at}/\tau_p \times \ln\{I/I_{th}\}$. For 400 nm irradiation of silicon using a femtosecond laser pulse, the ablation rate is estimated $\sim 1.67 \times 10^{29}$/cm$^2$·s $\times \ln\{I/I_{th}\}$. For strong fields $\sim 10^7$ V/m, we obtained an estimate of $I_{th} \sim 5 \times 10^{11}$ W/cm$^2$. Assuming an operational intensity such that $I/I_{th} \approx 2$, we find $j \sim 10^{29}$/cm$^2$·s. The number of ablated ions per laser pulse is $L_{ab} \times N_{at} \times S$, where S is the surface area available for ablation. In the exemplary planar configuration, S is the focal area $\approx \pi \times 10^{-8}$ cm$^2$ ($S \approx \pi \omega^2$, where $\omega \sim 1$ micron). Then the number of ablated atoms per laser pulse is $\sim 10^8$-$10^9$. Similarly, in a typical field emission tip application, the ablation rate ramps from zero at threshold to $j \sim 10^{29}$/cm$^2$·s at twice threshold. However the tip surface area is $S \approx 2\pi r^2$, where $r \approx 50$ nm, such that $S \approx 1.6 \times 10^{-10}$ cm$^2$, which implies a reduction in the number of atoms ablated per pulse to approximately $10^6$. Such large efficiencies of atom yield near threshold are a well above the rates seen in conventional field ion microscopy.

Therefore, as disclosed herein, the Method of Direct Coulomb Explosion in Laser Ablation of Semiconductor Structures provides a new and remarkable capability to effect and control laser ablation, and in so doing, substantially departs from the conventional concepts and designs of the prior art.

As to a further discussion of the manner of usage and operation of the present disclosure, the same should be apparent from the above description. Accordingly, no further discussion relating to the manner of usage and operation will be provided.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosure to the exact construction and operation described, and accordingly, all suitable modifications and equivalents may be resorted to, falling within the scope of the disclosure.

REFERENCES

U.S. Patent Documents:

| | | | |
|---|---|---|---|
| 6,878,900 | April 2005 | Corkum | 216/121.69 |
| 6,590,182 | July 2003 | Domae | 216/121.69 |
| 6,534,743 | March 2003 | Swenson | 216/121.69 |
| 6,046,429 | April 2000 | Datta | 216/121.69 |
| 6,534,743 | March 2003 | Sun | 216/121.68 |

Other Publications:

"Scaling laws of femtosecond laser pulse induced breakdown in oxide films," M. Mero et al., Phys. Rev. B, vol. 71, 115109 (2005).

"Comment on "Coulomb explosion in femtosecond laser ablation of Si(111)," [Appl. Phys. Lett. 82, 4190 (2003)]," R. Stoian et al., Appl. Phys. Lett. 85(4), 694-695 (2004).

"Model description of surface charging during ultra-fast pulsed laser ablation of materials," N. M. Bulgakova et al., Appl. Phys. A 79, 1153-1155 (2004).

"Electronic transport and consequences for material removal in ultrafast pulsed laser ablation of materials," N. M. Bulgakova et al., Phys. Rev. B 69, 054102 (2004).

"Coulomb explosion in femtosecond laser ablation of Si(111)," W. G. Roeterdink et al., Appl. Phys. Lett. 82, 4190 (2003).

"Surface charging and impulsive ion ejection during ultrashort pulsed laser ablation," R. Stoian et al., Phys. Rev. Lett., vol. 88, paper 097603 (2002).

"Laser-induced breakdown and damage in bulk transparent materials induced by tightly focused femtosecond laser pulses," C. B. Schaffer, A. Brodeur and E. Mazur, Meas. Sci. Technol., vol. 12, pp. 1784-1794 (2001).

"Ablation of solids by femtosecond lasers: ablation mechanism and ablation thresholds for metals and dielectrics," E. G. Gamaly et al., Phys. of Plasma, vol. 9, pp. 949-957 (2002).

"Fundamentals of Semiconductors: Physics and Materials Properties, Third Edition," P. Yu and M. Cardona, Springer-Verlag, Berlin Heidelberg, 2001.

"Coulomb explosion in ultrashort pulsed laser ablation of Al$_2$O$_3$," R. Stoian et al., Phys. Rev. B, vol. 62, pp. 13167-13173 (2000).

"Short-pulse laser damage in transparent materials as a function of pulse duration," A. Tien et al., Phys. Rev. Lett., vol 82, pp. 3883-3886 (1999).

"Ultrashort-pulse laser machining of dielectric materials," M. D. Perry et al., J. Appl. Phys., vol. 85, pp. 6803-6810 (1999).

"Ultrafast Electron Dynamics in Femtosecond Optical Breakdown of Dielectrics," M. Li et al., Phys. Rev. Lett., vol. 82, pp. 2394-2397 (1999).

"Avalanche ionization and dielectric breakdown in silicon with ultrafast laser pulses," P. P. Pronko et al., Phys. Rev. B, vol. 58, pp. 2387-2390 (1998).

"Femtosecond Optical Breakdown in Dielectrics," M. Lenzner et al., Phys. Rev. Lett., vol. 80, 4076 (1998).

"High power laser semiconductor interactions: a Monte Carlo study for silicon," K. Yeom, H. Jiang, and J. Singh, J. Appl. Phys., vol. 81, pp. 1807-1812 (1997).

"Nanoscale modification of silicon surfaces via Coulomb explosion," H. P. Cheng and J. D. Gillespy, Phys. Rev. B, pp. 2628-2636 (1997).

"Ablation of Si and Ge using UV femtosecond laser pulses", G. Herbst et al., Mater. Res Soc. Symp. Proc., vol. 397, pp 69-74 (1996).

"Femtosecond, picosecond and nanosecond laser ablation of solids," B. N. Chichkov et al., Appl. Phys. A, vol. 63, pp. 109-115 (1996).

"Nanosecond-to-femtosecond laser-induced breakdown in dielectrics," B. C. Stuart et al., Phys. Rev. B, vol. 53, pp. 1749 (1996).

"Optical ablation by high-power short-pulse lasers," B. C. Stuart et al., J. Opt. Soc. Amer. B, vol. 13, pp. 459 (1996).

"Reduction in multi-photon ionization in dielectrics due to collisions," D. Du, X. Liu, and G. Mourou, Appl. Phys. B, vol. 63, pp. 617-621 (1996).

"Laser-Induced Damage in Dielectrics with Nanosecond to Subpicosecond Pulses," B. C. Stuart et al., Phys. Rev. Letters, vol. 74, pp. 2248 (1995).

"Thermophysical effects in laser processing of materials with picosecond and femtosecond pulses," P. P. Pronko et al., J. Appl. Phys., vol. 78, pp. 6233-6240 (1995).

"Threshold dependence of laser induced optical breakdown on pulse duration," M. H. Niemz, Appl. Phys. Lett., vol. 66, pp. 1181-1183 (1995). "Laser-induced breakdown by impact ionization in SiO2 with pulse widths form 7 ns to 150 fs," D. Du et al., Appl. Phys. Letters, vol. 64, pp. 3071 (1994).

"Dynamical theory of the laser-induced lattice instability of silicon," P. Stampfli and K. H. Bemmemann, Phys. Rev. B, vol. 46, pp. 10686-10692 (1992).

"CONTEMPORARY NONLINEAR OPTICS," Edited by Govind P. Agrawal and Robert W. Boyd, Academic Press, New York, 1992.

"Laser induced electric breakdown in solids," N. Bloembergen, IEEE J. Quantum Electron, vol. QE-10, pp. 375-386 (1974).

"PHYSICAL KINETICS," E. M. Lifshitz and L. P Pitaevskii, Pergamon, Oxford, 1981.

"IONIZATION IN THE FIELD OF A STRONG ELECTROMAGNETIC WAVE," L. V. Keldysh, Sov. Phys. JETP 20, 1307 (1965).

"THE EFFECT OF A STRONG ELECTRIC FIELD ON THE OPTICAL PROPERTIES OF INSULATING CRYSTALS," L. V. Keldysh, Sov. Phys. JETP 7 (34), 788 (1958).

The invention claimed is:

1. A method for obtaining primarily non-thermal ablation of material from a semiconductor or dielectric structure, the method comprising the steps of:
   a) illuminating an area of a surface of the semiconductor or dielectric structure using a pulsed laser beam, wherein the laser pulse length of said laser beam is commensurate with, or less than, the time it takes for electrons in the semiconductor or dielectric structure to transfer their energy to the atomic lattice, known as the plasma relaxation time;
   b) illuminating said area of said surface of the semiconductor structure using said pulsed laser beam, wherein the wavelength of the pulsed laser beam is selected such that interband optical absorption provides a carrier production rate in excess of an avalanche photoionization rate in said semiconductor or dielectric structure; and
   c) illuminating said area of said surface of the semiconductor structure using said pulsed laser beam, wherein the intensity of said pulsed laser beam is selected such that electronic charge is sufficiently evacuated to induce Coulomb explosion of near-surface layers of said semiconductor or dielectric structure, wherein the ablation threshold for direct Coulomb explosion is less than the threshold for avalanche photoionization-induced Coulomb explosion;
   whereby ablation by Coulomb explosion occurs in the absence of avalanche photoionization.

2. The method as defined in claim 1 further comprising the steps of:
   selecting the wavelength of the pulsed laser beam so that the linear optical absorption rate may be controlled by an electric-field-induced redshift of the optical absorption, known as the Keldysh effect, and
   applying an external electric field to the semiconductor or dielectric structure to control the linear absorption rate.

3. The method as defined in claim 2 further comprising the step of:
   providing nanometer scale variations in the external electric field due to nanometer scale surface variations in said semiconductor or dielectric structure, whereby selective material ablation on a scale smaller than one micrometer is enabled.

4. The method as defined in claim 1 further comprising the step of:
   detecting ablated material using a technique selected from the group consisting of time of flight detection, position sensitive detection, and mass spectrometry.

5. The method as defined in claim 1, wherein
   the semiconductor or dielectric structure includes a material selected from the group consisting of silicon, carbon, germanium, silicon carbide, silicon germanium, boron, phosphorus, arsenic, gallium arsenide, aluminum arsenide, gallium nitride, aluminum nitride, indium nitride, gallium phosphide, indium phosphide, and indium arsenide.

6. A method of non-thermal laser ablation comprising the steps of: providing a structure selected from the group consisting of semiconductor and dielectric materials, said structure characterized by a plasma relaxation time and a strong linear optical absorption band; providing a laser beam pulse characterized by a pulse length equal to or less than said plasma relaxation time, an intensity sufficient to induce Coulomb explosion of a near-surface layer of said structure, and having a wavelength that corresponds with said strong linear optical absorption band, whereby ablation by Coulomb explosion occurs in the absence of avalanche photoionization; illuminating an area of said structure by said laser beam pulse; and producing in said structure a carrier production rate due to interband optical absorption of said laser beam pulse that exceeds an avalanche photoionization rate in said structure due to illumination by said laser beam pulse.

7. The method of claim 6 further comprising the steps of:
applying an electric field to said structure;
shifting said strong linear optical absorption band by said electric field; and
controlling said carrier production rate by said electric field.

8. The method of claim 7 further comprising the step of:
producing nanometer scale variations in said electric field whereby selective material ablation on a scale smaller than one micrometer is enabled.

9. The method of claim 6 further comprising the steps of:
selecting said pulse length within the range of 10 picoseconds to 10 femtoseconds; and
selecting the wavelength so that the resultant extinction coefficient of said structure exceeds ½.

* * * * *